Aug. 17, 1943.  D. H. FAIR  2,326,846

OPHTHALMIC MOUNTING

Filed March 12, 1941

DRURY H. FAIR
INVENTOR

BY *[signature]*
ATTORNEY

Patented Aug. 17, 1943

2,326,846

UNITED STATES PATENT OFFICE 2,326,846

OPHTHALMIC MOUNTING

Drury H. Fair, Evanston, Ill., assignor to Bausch & Lomb Optical Company, Rochester, N. Y., a corporation of New York Application March 12, 1941, Serial No. 382,964

3 Claims. (Cl. 88—43)

This invention relates to ophthalmic mountings and more particularly it has reference to eyeglasses and spectacles which embody multi-focal lenses having portions which are used for distant vision and portions which are used for near vision, such as in reading. In such types of lenses, the reading portions are generally relatively small areas which are located below the centers of the lenses with the remainders of the lenses unrestricted for distant vision use. With the reading portions so positioned, it is necessary for the wearer, when reading, to tilt his head backwards and look downwardly so that vision may be had through the reading portions of the lenses. This is a rather awkward and tiring position and to overcome this disadvantage, it has been proposed to provide spectacles in which either the lenses or the nose engaging portions of the bridge may be moved vertically relative to the other so as to selectively position the reading portions directly in front of the eyes for reading. Such constructions of the prior art have, however, been too complicated or have not been rugged and efficient for practical use.

One of the objects of my invention is to provide an improved ophthalmic mounting of the type described which will be simple in structure and efficient in operation. Another object is to provide an ophthalmic mounting in which the lenses are pivotally linked to the bridge for selective vertical adjustment with respect thereto. A further object is to provide an ophthalmic mounting in which the lenses may be vertically positioned relative to the bridge through pivotal connections and held in adjusted position. These and other objects and advantages reside in certain novel features of construction, arrangement and combinations of parts as will hereinafter be more fully described and pointed out in the appended claims.

Referring to the drawing.

Figure 1:
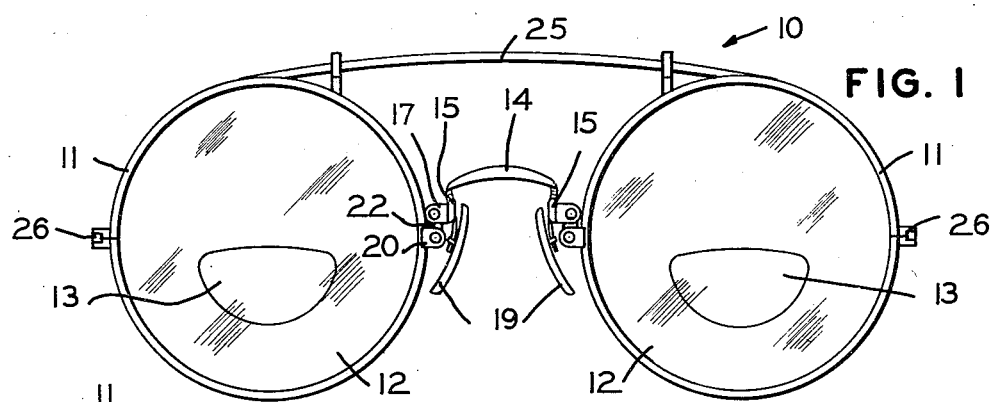
Fig. 1 is a front view of a spectacle embodying my invention.

A preferred embodiment of my invention is shown on the drawing wherein 10 indicates, generally, a spectacle comprising the two spaced lens holding devices or rim portions 11 carrying the lenses 12 having the reading portions 13 positioned below the centers of the lenses. Positioned between the lens holding devices 11 is the bridge 14 having two spaced side portions 15. A U-shaped member 16 having two spaced lugs 17, forming bearing members, is secured to each side portion 15, as by soldering, for example. Each side portion 15 also carries a rearwardly extending arm 18 which supports the nose-engaging member 19.

Fixedly secured, as by soldering, to the nasal side of each lens holding device 11 are the spaced plates 20, forming bearing members, which are substantially vertically aligned with the lugs 17. A link 22 has one end pivotally mounted between the lugs 17 by a pivot pin 23 while the other end of the link is pivotally secured between the plate 20 by pivot pin 24. The upper portions of the lenses 12 are connected by a flat spring member 25 which extends substantially tangentially to the upper parts of the lenses 12 and has its two ends secured respectively to the spaced lens holding devices 11. Each lens holding device 11 carries the usual endpiece 26 to pivotally receive a temple, not shown.

Figures 2, 4:
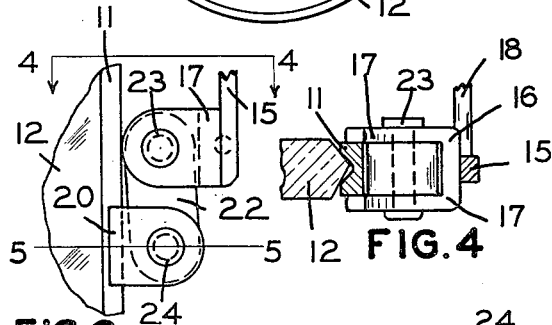
Fig. 2 is an enlarged fragmentary view showing the position of the link when the lenses are in the normal or "down" position as shown in Fig. 1.
Fig. 4 is a view taken on line 4—4 of Fig. 2.
Figure 3:
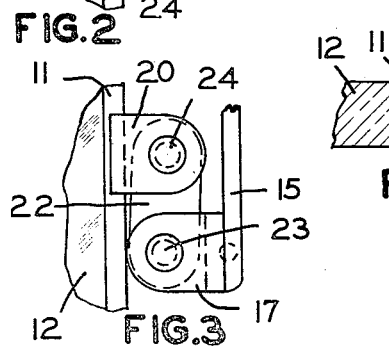
Fig. 3 is a similar view showing the position of the parts when the lenses are in the reading or "up" position.
Figure 5:
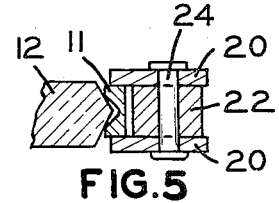
Fig. 5 is a view taken on line 5—5 of Fig. 2.

From the foregoing, it will be apparent that the lenses are pivotally secured to the bridge 14 and may be adjusted relative thereto. In the position of the link 22 shown in Figs. 1 and 2, the bearing members 20 are below the bearing members 17 and the lenses are in the "down" position and adapted especially for distant vision use of the lenses. When the wearer wishes to use the reading portions 13 of the lenses 12 for near vision, the lenses are swung to the "up" position so that the link 22 will be located as shown in Fig. 3. This adjustment can be accomplished by swinging the lenses outwardly, upwardly and inwardly about the pivot pins 23 and 24 and against the tension of the spring 25. To adjust the lenses to the "down" or reading position, they are moved outwardly, downwardly and inwardly about the pivots. It will be noted that the spring 25 exerts an inward tension which tends to keep the lenses in either the "up" or "down" adjusted position so that a change from either position must be made against the tension of spring 25 and hence accidental displacement is prevented.

Figure 6:
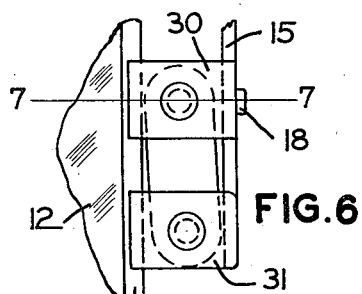
Fig. 6 shows a modified type of link connection.
Figure 7:
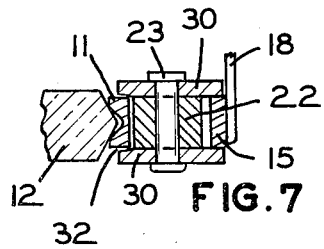
Fig. 7 is a view taken on line 7—7 of Fig. 6.

In Figs. 6 and 7 there is illustrated a slightly modified type of link connection wherein the bearing members for one end of the link are provided by a pair of spaced plates 30 soldered to the bridge side 15 and the bearing for the other end is provided by a pair of spaced plates 31 soldered to the lens holding device 11. As shown in Fig. 7, the plates 30 project laterally beyond the link and form a recess into which fits the lens holding device 11 as shown at 32. The plates 31 similarly are formed to engage the side of bridge 15. This construction affords rigidity and tends to hold the parts in adjusted position together with the spring 25.

Figure 8:
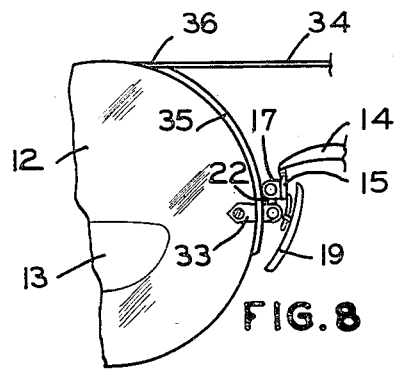
Fig. 8 shows a modification illustrating the application of my invention to the so-called rimless type of spectacle or eyeglass.

The modification shown in Fig. 8 illustrates the adaptation of my invention to an eyeglass or spectacle of the so-called rimless type. In this construction, the bridge 14 is pivotally linked to lens straps 33 instead of to the rim 11 as in Fig. 1. The lens straps 33 may be connected to the lens 12 by a screw or any other holding means known to the art. Instead of employing the spring 25 shown in Fig. 1, the spring tension is provided by the flat spring member 34 whose ends are connected to arms 35 extending upwardly along the edge of the lens from the straps 33. The end of the spring 34 engages the upper portion of the edge of the lens at 36 so that the lenses may be flexed outwardly against the tension of spring 34 and swung about the pivots to selectively position the lenses in adjusted position.

From the foregoing it will be apparent that I am able to attain the objects of my invention and provide an improved ophthalmic mounting in which the lenses may be selectively positioned relative to the bridge. The bridge is fitted properly to the nose and the lenses are moved up or down with respect to the bridge. The mounting is not complicated and is rugged in construction and efficient in operation. The lenses may be adjusted by the wearer without taking the mounting off the face. Various modifications can obviously be made without departing from the spirit of my invention. Thus, other resilient means may be provided instead of springs 25 and 34 to hold the lenses in adjusted position. My invention can also be embodied in various types of spectacles and eyeglasses whether of the rimmed, semi-rimmed or rimless construction.

I claim:

1. An ophthalmic mounting comprising a pair of spaced rim portions attached to lenses, a bridge positioned between said rim portions and having spaced vertical sides, a pair of spaced lugs secured to each bridge side, a pair of spaced lugs secured to the nasal side of each rim portion, a link pivotally connecting the respectively adjacent pairs of lugs whereby the lenses may be selectively adjusted with respect to said bridge, the spaced lugs secured to the rim portions being constructed to receive the sides of the bridge, and a resilient member connecting the upper parts of the rim portions.

2. An ophthalmic mounting comprising a pair of spaced rim portions attached to lenses, a bridge positioned between said rim portions and having spaced vertical sides, a pair of spaced lugs secured to each side of the bridge, a bearing member projecting laterally from the nasal side of each rim portion, links pivotally connecting the respectively adjacent lugs and bearing members whereby the lenses may be selectively adjusted with respect to the bridge, the spaced lugs secured to the bridge projecting outwardly a distance greater than the width of the link whereby they receive the rim portions when in adjusted position, and means for holding the parts in adjusted position.

3. In an ophthalmic mounting the combination of a rim portion extending along the nasal edge of a lens, a bridge having a side adjacent said rim portion, a pair of spaced lugs extending from the side towards the rim portion, a pair of spaced lugs extending from the rim portion towards the side, a link having its respective ends pivotally secured between the respective pairs of lugs whereby the lens may be selectively adjusted relative to the bridge, both pairs of lugs being longer than the width of the link whereby the lugs on the bridge side will receive the rim portion and the lugs on the rim portion will receive the bridge side when the lens is in adjusted position, and resilient means for holding the parts in adjusted position.

DRURY H. FAIR.